Nov. 10, 1936. J. K. MOHR 2,060,683
EGG SEPARATOR
Filed Dec. 3, 1932  2 Sheets—Sheet 1
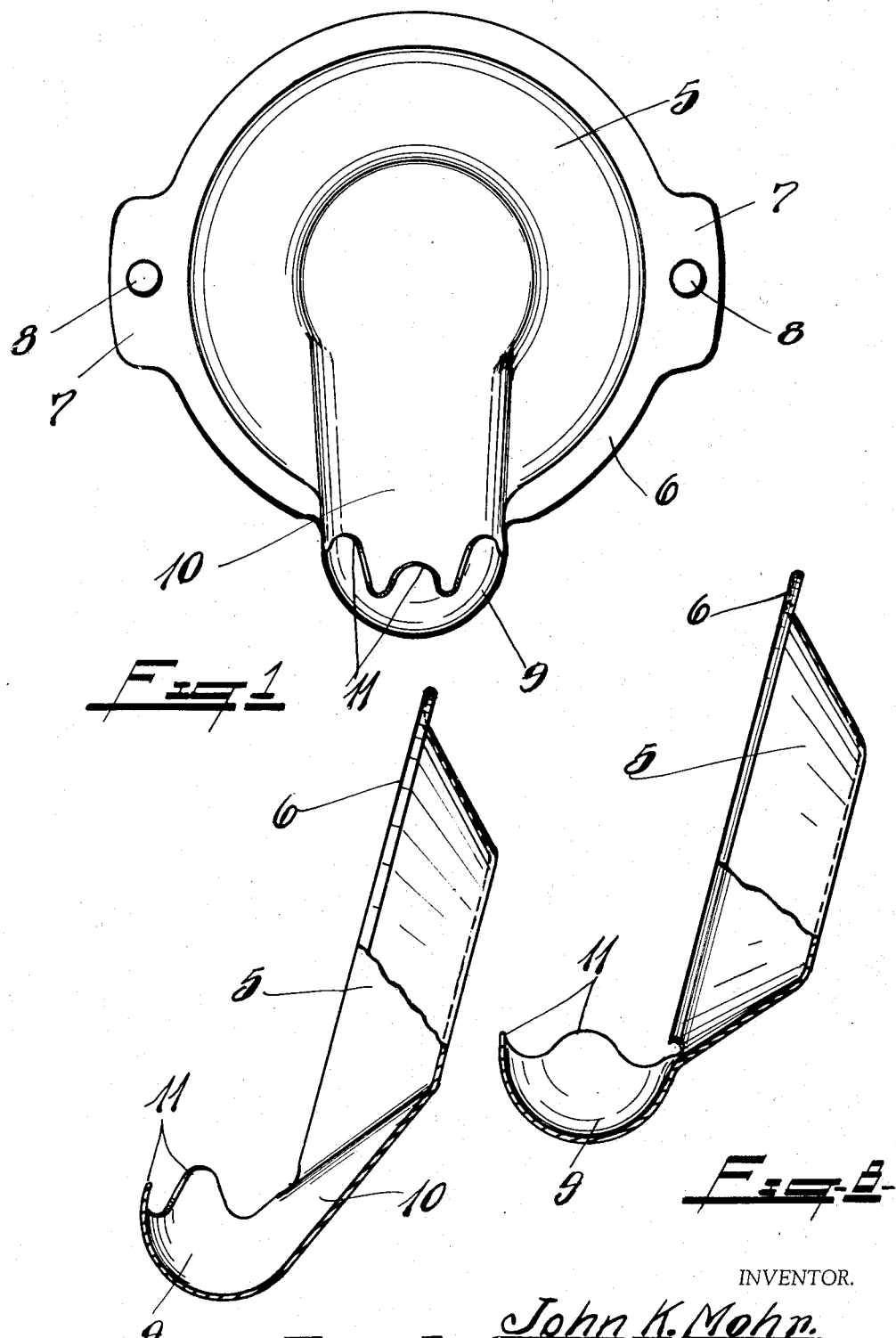
INVENTOR.
John K. Mohr.
BY Frank C. Earman.
ATTORNEY.

Nov. 10, 1936.     J. K. MOHR     2,060,683
EGG SEPARATOR
Filed Dec. 3, 1932     2 Sheets—Sheet 2
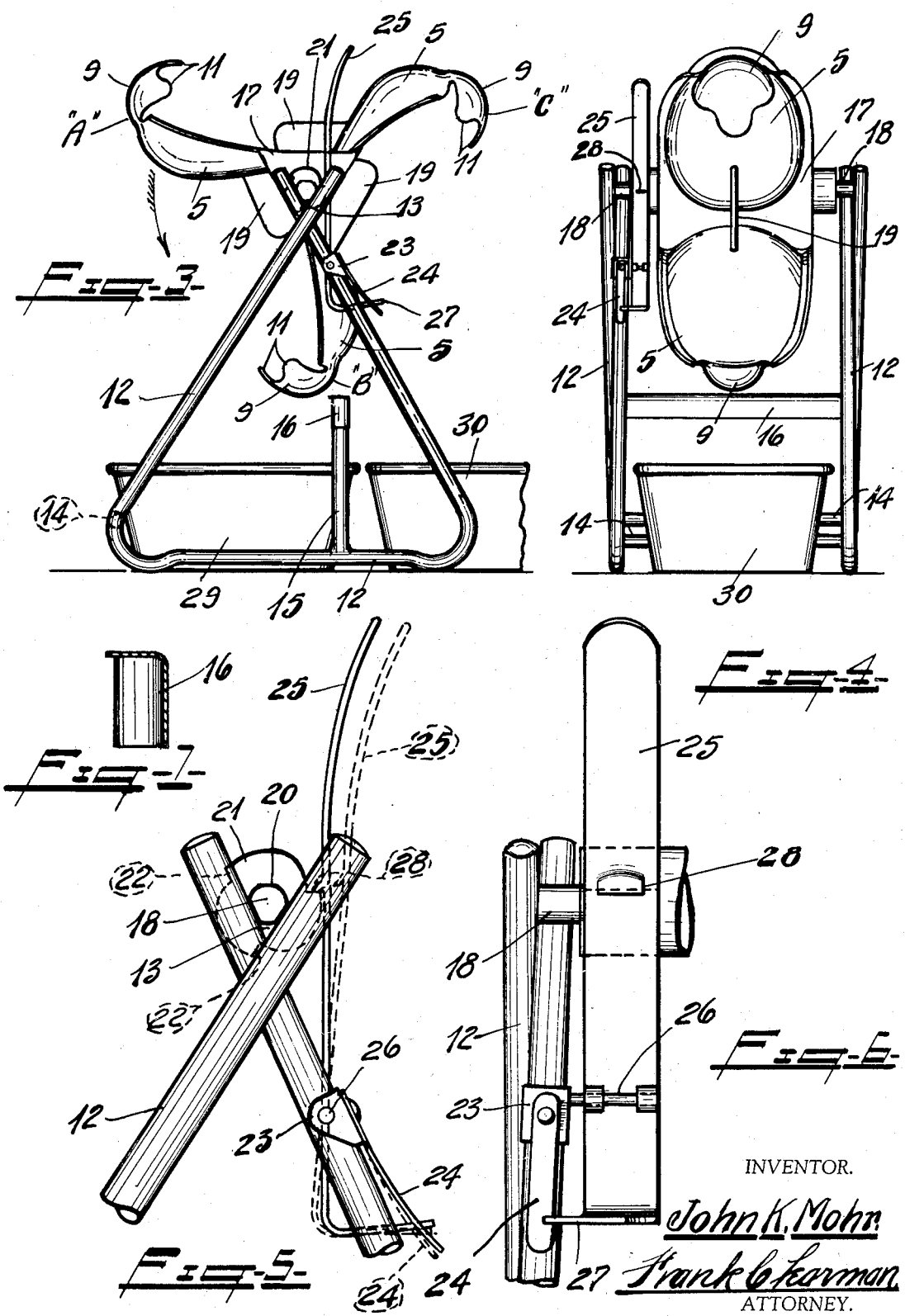
INVENTOR.
John K. Mohr
Frank C. Fearman
ATTORNEY.

Patented Nov. 10, 1936

2,060,683

UNITED STATES PATENT OFFICE 2,060,683

EGG SEPARATOR

John K. Mohr, Bay City, Mich.

Application December 3, 1932, Serial No. 645,509

13 Claims. (Cl. 146—2)

This invention relates to improvements in egg separators, and more particularly to that class of separators in which a receptacle is adapted to receive the egg in its entirety after being removed from the shell, and which when tilted will cause the egg to flow into a relatively smaller cup shaped extension, so that the albumen overflows and is separated from the yolk.

One of the prime objects of the present invention is to design an egg separator which separates each egg individually, holding it in a separate compartment after it is removed from the shell, thereby affording ample opportunity for inspection, so that a bad egg can be detected and removed without mixing with and spoiling the whole lot, which, where large quantities are used, would cause considerable loss.

Another object is to provide an egg separator of neat and pleasing appearance, which can be economically manufactured, and which has no sharp corners or edges, so that the entire surface can be easily and thoroughly cleaned.

A further object is to design an egg separator provided with a plurality of radiating separating receptacles, which has all the advantages of the individual separator, and which is adapted for use where large numbers of eggs are separated, either in the household, a bakery, or similar institutions.

A further object still is to design a separator having a plurality of receptacles built as a unit, and provide locking means for preventing movement or rotation of the said unit until tripped by the operator.

With these and other objects in view, the present invention consists in the construction and novel combination of parts, hereinafter fully described, illustrated in the accompanying drawings, and pointed out in the claims; it being understood that various changes in the form, proportions, size, and minor details of construction, within the scope of the claims appended, may be resorted to without departing from the spirit, or sacrificing any of the advantages of the invention.

In the drawings:—

Fig. 1 is a top plan view of my improved egg separator.

Fig. 2 is a part sectional edge view showing the separator provided with a plurality of receptacles.

Fig. 3 is a side elevation of a separator provided with a plurality of receptacles.

Fig. 4 is a rear view thereof.

Fig. 5 is an enlarged fragmentary side view illustrating the cam and trip lever, the dotted lines showing the lever in tripped position.

Fig. 6 is a rear view thereof.

Fig. 7 is an enlarged transverse sectional view of the scraper element.

Fig. 8 is a view similar to Fig. 2 and showing a slightly different design.

Referring now particularly to Figs. 1, 2, and 8 of the drawings in which I have illustrated the egg separator designed for general household use where limited quantities of eggs are separated.

This separator can be formed of any desired material, either pressed from sheet metal, molded from glass, or from any other suitable material or composition. The receptacle is preferably shaped as shown in Figs. 1 and 2, the numeral 5 indicating the main body which is comparatively shallow, and which is formed with a rolled rim 6 as usual, certain sections of said rim being flatted as shown at 7 to form smooth finger grips, and openings 8 are formed in said flatted sections to facilitate handling and so that the separator may be hung on a hook when not in use.

A cup shaped compartment 9 is formed integral with the receptacle and on the edge thereof, said compartment being disposed in a plane substantially at right angles to the main body, and in Figs. 1 and 2, I have shown the section 10 of the side wall directly adjacent the cup shaped compartment as rounded or grooved, so that the egg readily flows therein when the receptacle is tilted, said compartment being of a size to accommodate the yolk of an egg, the edges of the compartment being scalloped as shown at 11 so that the albumen or white readily overflows and drips into a suitable dish (not shown), provided for the purpose, after which the yolk is placed in any desired receptacle.

The scalloping of the edges is of particular importance in that the white or albumen which readily flows is caused to quickly separate; on the other hand, the yoke is more of a homogenous body being encased in a thin film or sack so that even though it fills the receptacles to a point above the low points of the scallops, it is still retained therein, this scalloping feature accommodating egg yolks of various sizes and effectively separating the albumen and the yolk.

In Figs. 3 and 4 of the drawings, I have shown the separator such as designed for use where large numbers of eggs are used. This comprises a pair of side frames 12, preferably formed of tubing, the upper ends being crossed and welded together to form a bearing 13. Transversely disposed connecting bars 14 secure the side frames in spaced apart relation, and a vertically disposed standard 15 is provided on each side frame, a detachable scraper element 16 being mounted on said standards, and is shaped as clearly shown in Fig. 7 of the drawings.

A block member 17 is revolubly supported on the side frames, and shaft sections 18 project therefrom and are mounted in the bearings 13 in the usual manner, spaced apart receptacles being provided on said block as shown, and relatively thin fins 19 are provided in each receptacle so that the egg shell may be broken thereon, this block and the receptacles forming a complete unit which can be readily removed for cleaning as required. The shape of the main body of the receptacle is slightly different than that shown in Figs. 1 and 2 of the drawings, but this is merely to adapt it to the production model, the principle being exactly the same.

The ends of the shaft sections 18 are flatted as shown at 20, and a cam member 21 is provided on one of the shaft sections directly adjacent one of the bearings, notches 22 being provided in the face thereof and for a purpose to be presently described.

A clip 23 is secured to the leg of one of the side frames, and a flat spring member 24 is secured thereto, a trip lever 25 being also pivotally connected to the frame by means of the pin 26, the lower end being bent at right angles and is offset, as shown at 27, to engage said spring, a tongue 28 being punched in the lever directly adjacent the cam, and is adapted to engage therewith to hold said unit against rotation.

In operation the device operates as follows: When an egg is broken and placed in the receptacle positioned at "A", the operator trips the lever 25 to disengage the tongue from the cam, the weight of the egg flowing outwardly in the receptacle rotates the unit in the direction as indicated by the arrow in Fig. 3 of the drawings and until the tongue 28 engages the next notch in the cam; when this receptacle has moved to position "B", the yolk is in the cup shaped compartment 9, the albumen then drips into the pan 29, and any albumen adhering to the surface of the compartment is scraped off by the scraper 16; as the unit is rotated to position "C", the yolk being discharged into the pan 30, and as each egg is broken, the trip lever is actuated to bring an empty receptacle into position, the operation being continuously repeated until the required number are separated, or until the pans are filled.

Each egg can be inspected before the albumen or yolk mixes with the eggs already separated. The operation is rapid and easy, and the separation is automatically effected as the unit is rotated, the trip lever engaging each notch so that the unit stops in proper position.

The design shown in Fig. 8 of the drawings is very similar to that shown in Figs. 1 and 2, excepting that the groove 19 is omitted so that it can be readily manufactured from certain refractory materials.

From the foregoing description it will be obvious that I have perfected a very simple, practical, and economical egg separator for household or bakery use, which can be readily cleaned, and which effectively separates the albumen from the yolk.

What I claim is:

1. An egg separator, comprising a relatively shallow dish provided with a rim, formed sections on the rim to facilitate the handling thereof, a cup shaped extension formed integral with the dish and disposed in a plane substantially at right angles thereto, and scallops formed in the rim of said cup extension so that when the contents of an egg are disposed in said cup shaped extension the albumen of the egg will overflow and escape between the scallops.

2. An egg separator, comprising a frame, a plurality of receptacles rotatably mounted thereon and formed as an individual unit, each receptacle having a cup shaped extension formed integral therewith, said extensions being disposed in a plane substantially at right angles to the main body of the receptacle.

3. An egg separator of the class described, and comprising a frame, a unitary structure rotatably mounted thereon, and comprising a plurality of receptacles having a cup shaped extension formed integral therewith, and disposed at an angle with relation to the main body of the receptacle, and scallops formed in the edge of the cup shaped extension.

4. An egg separator of the class described, and comprising a frame, a unitary structure rotatably mounted thereon, and comprising a plurality of receptacles having an offset cup shaped extension formed integral therewith, and a relatively thin fin provided in each receptacle.

5. An egg separator of the class described, and including a frame, a unitary structure rotatably mounted thereon, and comprising a plurality of receptacles mounted thereon in spaced apart relation, a cup shaped extension formed integral with each receptacle, and into which the egg flows when the structure is rotated, and a scraper on the frame for scraping the albumen hanging from the cup as the structure is rotated.

6. An egg separator of the class described, and including a support, a unitary structure rotatably mounted thereon, and comprising a plurality of receptacles, a cup shaped extension formed integral with each receptacle, and disposed in a plane substantially at right angles to the main body thereof, means for holding said structure in certain predetermined positions, and means for releasing said holding means to permit the structure to rotate through a predetermined arc of travel.

7. An egg separator of the class described, and comprising a support, a unitary structure rotatably mounted thereon, and including a plurality of receptacles, a relatively thin fin in each receptacle, means for holding said structure in certain predetermined positions, said means comprising a spring retracted trip lever and a cam, and teeth on said cam for engagement by said lever to hold it in set positions.

8. An egg separator of the class described, and comprising a support, a unitary structure rotatably mounted thereon, and comprising a plurality of receptacles, offset cup shaped extensions formed integral with each receptacle, a scraper on the support and disposed directly adjacent the path of travel of said receptacles, manually actuated means for holding said structure in certain predetermined positions, said means permitting a limited degree of rotation when the mechanism is tripped.

9. A device for separating the whites from the yolks of eggs comprising a shallow receptacle in which the egg is placed, an imperforate cup shaped extension of smaller size than the shallow receptacle, and of such size that when the contents of an egg are disposed therein, the albumen of the egg will spill over the sides thereof, provided on said receptacle, and disposed in a plane substantially at right angles to the receptacle for receiving the yolk when the receptacle is tilted.

10. A device for separating the whites from the yolks of eggs, and comprising a shallow receptacle adapted to receive an egg, a cup shaped extension provided on said receptacle and disposed in a plane substantially at right angles to the receptacle, said extension being of a predetermined size to accommodate the yolk of an egg, and scallops provided in the upper edge of said cup shaped extension to facilitate drainage of the egg whites.

11. An egg separator of the class described and comprising a main shallow receptacle in which an egg is placed, a smaller imperforate cup shaped extension of predetermined size formed integral therewith for receiving the egg when the receptacle is tilted, the rim of said cup shaped extension being scalloped to permit drainage of the albumen of the egg while retaining the yolk therein.

12. An egg separator of the class described comprising a main receptacle in which an egg is placed, an imperforate cup shaped extension of predetermined size provided on the main receptacle and into which the egg flows as the receptacle is tilted, the rim of said cup shaped extension being scalloped to permit drainage of the albumen of the egg while retaining the yolk therein.

13. A device for separating the whites from the yolks of eggs comprising a main receptacle having a relatively smaller imperforate cup shaped extension formed thereon and so disposed that when the receptacle is tilted, the egg will flow into said extension, and scallops on the rim of the extension to permit drainage of the egg whites while retaining the yolk therein.

JOHN K. MOHR.